D. M. BLISS.
ALTERNATING CURRENT RECTIFIER.
APPLICATION FILED AUG. 21, 1911.
1,204,395.
Patented Nov. 14, 1916.
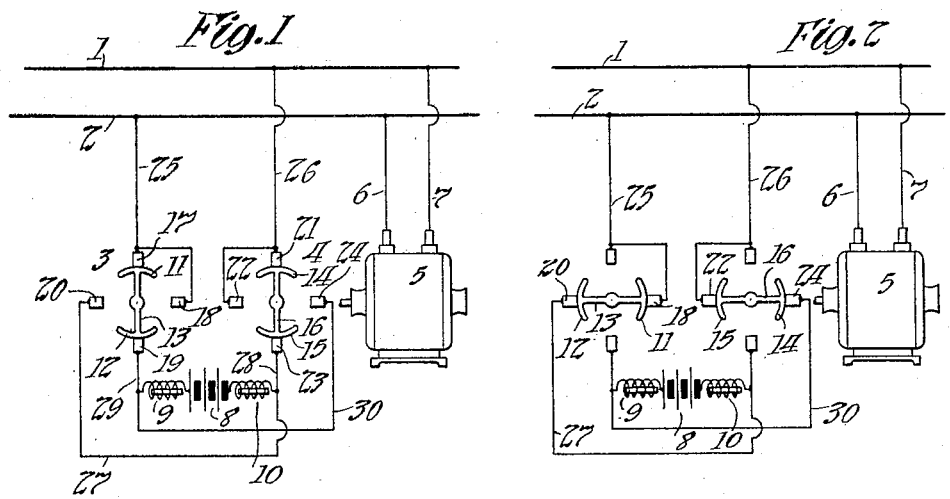
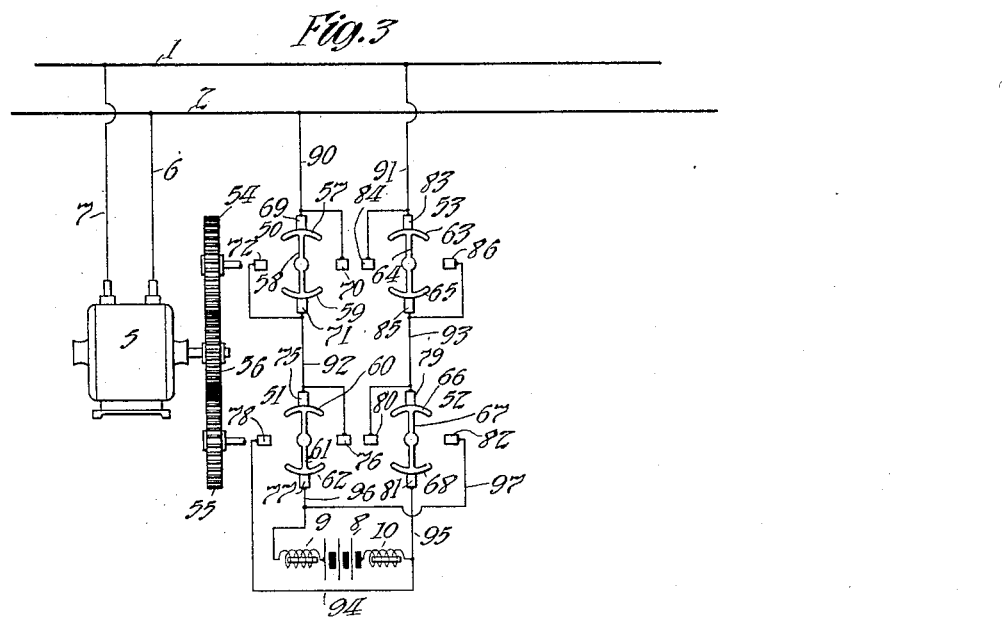
Witnesses:
Chas H. Van Gieson
Henry Lanahan
Inventor:
Donald M. Bliss
by Frank C. Rivers
his Atty.

UNITED STATES PATENT OFFICE.

DONALD M. BLISS, OF WEST ORANGE, NEW JERSEY, ASSIGNOR TO THOMAS A. EDISON, INCORPORATED, OF WEST ORANGE, NEW JERSEY, A CORPORATION OF NEW JERSEY.

ALTERNATING-CURRENT RECTIFIER.

1,204,395.                    Specification of Letters Patent.    Patented Nov. 14, 1916.

Application filed August 21, 1911. Serial No. 645,164.

*To all whom it may concern:*

Be it known that I, DONALD M. BLISS, a subject of the King of Great Britain, and a resident of West Orange, in the county of Essex and State of New Jersey, have invented certain new and useful Improvements in Alternating-Current Rectifiers, of which the following is a specification.

In my application Serial No. 584,039, filed September 27, 1910, I have described and claimed a rectifying system in which a plurality of rectifying switches or commutators are connected in series in such a manner as to utilize alternate half waves of alternating current in a simple and efficient manner and operating without injurious sparking.

My present invention comprises an improvement on the invention described in the aforesaid application and consists in simple and efficient means for utilizing both half waves of the alternating current, and in the combinations and details of construction hereinafter described and claimed.

In the accompanying drawings which form a part of this specification, and in which like reference characters are used to designate like parts throughout the several views, Figure 1 is a diagrammatic view showing one embodiment of my invention at one stage in its operation, Fig. 2 is a diagrammatic view of the same at a later stage of operation, and Fig. 3 shows a modified arrangement.

Referring to the drawings, alternating current mains are shown at 1 and 2, and are fed from any convenient source with alternating current to be rectified. My improved rectifying system includes rectifying devices 3 and 4 having members which are driven in synchronism with the current to be rectified by any suitable means, as, for example, the synchronous motor 5 connected to the alternating current mains 1 and 2 by the conductors 6 and 7. In the particular arrangement illustrated the motor 5 is a four pole motor. The rectifying devices may be connected to supply unidirectional current to any direct work circuit, as for example, the circuit containing the battery 8. The adjustable inductance coils 9 and 10 are inserted in the direct current work circuit for the purpose of smoothing out the rectified current, and also for controlling the phase relations of the current impulses relative to the electro-motive force. The rectifying device 3 includes a switch member or commutator rotatably mounted and having active or conductive segments 11 and 12 connected by a conductor 13. The rectifying device 4 is of similar construction and includes active or conductive segments 14 and 15 connected by a conductor 16. The rectifying device 3 is provided with brushes 17, 18, 19, and 20, which, in the arrangement illustrated, are symmetrically disposed around the axis of rotation of the device, that is to say, they are 90 degrees apart. The rectifying device 4 is provided with a similar set of brushes 21, 22, 23, and 24 similarly arranged but in the reverse direction around the axis of rotation of the rectifying device 4. The brushes 17 and 18 are connected together and to the alternating current main 2 by the conductor 25. The brushes 21 and 22 of the device 4 are connected together and to the main 1 by the conductor 26. The brush 20 of the device 3 and the brush 23 of the device 4 are connected to one terminal of the direct current work circuit by the conductors 27 and 28 respectively. The brush 19 of the device 3 and the brush 24 of the device 4 are connected to the other terminal of the direct current work circuit by the conductors 29 and 30 respectively. The rotatable switch members or commutators, as stated before, are rotated in synchronism with the current to be rectified, while the brushes remain stationary. This may be accomplished by mounting said switch members on the same shaft as the armature of the motor, or in any other suitable manner.

Fig. 1 shows the relative position of the various parts of the apparatus corresponding to the crest of the half wave of the alternating current to be rectified, and at this instant the circuit may be traced as follows: from the alternating current main 2 through the conductor 25, brush 17, active segment 11, connecting conductor 13, active segment 12, brush 19, inductance 9, battery 8, inductance 10, conductor 28, brush 23, active segment 15, connecting conductor 16, active segment 14, brush 21, and the conductor 26 back to the alternating current main 1.

Fig. 2 shows the relative position of the parts of the apparatus at an instant one half wave later. At this time the flow of current is through the following circuit: from the alternating current main 1, through the conductor 26, brush 22, active segment 15, connecting conductor 16, active segment 14, brush 24, conductor 30, inductance 9, battery 8, inductance 10, conductor 27, brush 20, active segment 12, connecting conductor 13, active segment 11, brush 18, and conductor 25 back to the alternating current main 2. For other positions of the rotating parts, the circuits may be easily traced. In the arrangement illustrated, both half waves of alternating current are conducted in the same direction through the direct current work circuit containing the battery 8.

In Fig. 3 I have illustrated a modified arrangement of my improved rectifying system in which four rectifying devices 50, 51, 52, 53, are employed. The rotatable device 50 comprises a rotatable switch member or commutator having active segments 57 and 59 connected by the conductor 58. The rectifying devices 51, 52 and 53 are of similar construction and include active segments 60 and 62 connected by conductor 61, active segments 66 and 68 connected by conductor 67, and active segments 63 and 65 connected by conductor 64, respectively. The rotatable switch members are rotated in synchronism with the alternating current to be rectified and may all be mounted upon a single shaft, but in order to secure greater compactness, may be arranged as illustrated in Fig. 3. In this arrangement, the said switch members of the devices 50 and 53 are mounted upon the shaft of a gear wheel 54, and those of the devices 51 and 52 are mounted upon the shaft of a gear wheel 55. The gear wheels 54 and 55 are driven by gear wheel 56 mounted on the shaft of the armature of the motor 5. The rectifying device 50 is provided with brushes 69, 70, 71 and 72 symmetrically disposed around the axis of rotation of the device, that is to say, ninety degrees apart. The rectifying device 53 is provided with a similar set of brushes 83, 84, 85 and 86, similarly arranged, but in the reverse direction around the axis of rotation. The rectifying device 51 is provided with brushes 75, 76, 77 and 78 symmetrically disposed around the axis of rotation of the device, that is to say, ninety degrees apart. The rectifying device 52 is provided with a similar set of brushes 79, 80, 81 and 82 similarly arranged, but in the reverse direction around the axis of rotation. The brushes 69 and 70 of the device 50 are connected together and to the alternating current main 2 by the conductor 90. The brushes 83 and 84 of the device 53 are connected together and to the main 1 by the conductor 91. The brushes 71 and 72 of the device 50 and the brushes 75 and 76 of the device 51 are connected together by the conductor 92. The brushes 85 and 86 of the device 53 and the brushes 79 and 80 of the device 52 are connected together by the conductor 93. The brush 78 of the device 51 and the brush 68 of the device 52 are connected to one end of the direct current circuit containing the battery 8 by the conductors 94 and 95 respectively. The brush 77 of the device 51 and the brush 82 of the device 52 are connected to the other end of the direct current circuit containing the battery 8 by the conductors 96 and 97 respectively.

In Fig. 3 the relative position of the various parts of the apparatus is that corresponding to the crest of the half wave of the alternating current to be rectified, and at this instant, the circuit may be traced as follows:—from the alternating current main 2, through the conductor 90, brush 69, active segment 57, connecting conductor 58, active segment 59, brush 71, conductor 92, brush 75, active segment 60, connecting conductor 61, active segment 62, brush 77, conductor 96, variable inductance 9, battery 8, variable inductance 10, conductor 95, brush 81, active segment 68, connecting conductor 67, active segment 66, brush 79, conductor 93, brush 85, active segment 65, connecting conductor 64, active segment 63, brush 83, conductor 91, back to the alternating current main 1. One half wave later, the flow of current is through the following circuit:—from the alternating current main 1, through conductor 91, brush 84, active segment 65, connecting conductor 64, active segment 63, brush 86, conductor 93, brush 80, active segment 68, connecting conductor 67, active segment 66, brush 82, conductor 97, variable inductance 9, battery 8, variable inductance 10, conductor 94, brush 78, active segment 62, connecting conductor 61, active segment 60, brush 76, conductor 92, brush 72, active segment 59, connecting conductor 58, active segment 57, brush 70, and conductor 90, back to the alternating current main 2. For other positions of the rotating parts, the circuits may be easily traced, and it will be seen that both half waves of alternating current are conducted in the same direction through the direct current work circuit containing the battery 8.

In my improved rectifying system, the circuit is broken at a number of points simultaneously, thereby reducing the tendency to spark. For example, in the arrangement in Figs. 1 and 2, each time an active segment leaves a brush, the circuit is broken at four points, and in the arrangement shown in Fig. 3, each time an active segment leaves a brush, the circuit is broken at eight points. Obviously, a larger number of rectifying devices may be employed and a greater number of simultaneous breaks provided. My arrangement of apparatus permits the brushes to be spaced widely apart, thereby preventing any tendency to spark across or to form an arc between brushes of opposite polarity, and also affords a wide break between the active segment and the brush which it is leaving, thereby preventing the continuance of an arc between these two conductors. Furthermore, since comparatively wide active segments are employed, a less exactness of brush adjustment is required, and my improved apparatus will operate without appreciable sparking, even though the brushes are somewhat out of adjustment. Furthermore, my improved rectifying system permits the wide separation of active segments of different potentials instead of having such segments separated by narrow insulating spaces as was common prior to the invention of the rectifying systems disclosed in this and my prior application hereinbefore mentioned.

Having now described my invention, what I claim as new and desire to secure by Letters Patent of the United States is as follows:—

1. In an alternating current rectifying system, a plurality of switch members, a separate set of brushes for each switch member, means for producing relative movement of each switch member and its set of brushes, and means for connecting through all of said switch members half of the brushes of each set in series during one portion of said relative movement and the other half of the brushes of each set in series during another portion of said relative movement, substantially as described.

2. In an alternating current rectifying system, alternating current mains, a direct current translating device, a plurality of sets of brushes, and means including connections and a switch member for each set of brushes for connecting through all of said switch members half the brushes of each set in series with the said mains and direct current translating device during one half wave of alternating current and the other half of the brushes of each set in series with the said mains and direct current translating device during the other half wave of alternating current, substantially as described.

3. In alternating current rectifying apparatus, a plurality of rotatably mounted and spaced apart switch members, each comprising a pair of oppositely disposed conducting segments electrically connected together, a separate set of brushes for each of said switch members, each of said sets comprising four brushes symmetrically disposed around the axis of its switch member and in coöperative relation to said switch member, and means for rotating each of said switch members relatively to its set of brushes in synchronism with the current to be rectified, substantially as described.

This specification signed and witnessed this 18th day of August, 1911.

DONALD M. BLISS.

Witnesses:
HENRY LANAHAN,
ANNA R. KLEHM.

Copies of this patent may be obtained for five cents each, by addressing the "Commissioner of Patents, Washington, D. C."